March 28, 1961 A. M. SPRINGER 2,977,423

ROTATABLE ELECTROMAGNETIC TRANSDUCERS

Filed Dec. 26, 1957 3 Sheets-Sheet 1

INVENTOR:

Anton Marian Springer by Erwin Salzer his Atty.

March 28, 1961 A. M. SPRINGER 2,977,423

ROTATABLE ELECTROMAGNETIC TRANSDUCERS

Filed Dec. 26, 1957 3 Sheets-Sheet 2

INVENTOR:

Anton Marian Springer by Erwin Salzer his Atty.

March 28, 1961 A. M. SPRINGER 2,977,423

ROTATABLE ELECTROMAGNETIC TRANSDUCERS

Filed Dec. 26, 1957 3 Sheets-Sheet 3

INVENTOR:
Anton Marian Springer
by Erwin Salzer
his Atty.

United States Patent Office 2,977,423

Patented Mar. 28, 1961

2,977,423

ROTATABLE ELECTROMAGNETIC TRANSDUCERS

Anton Marian Springer, Homburg ver der Hoehe, Germany, assignor to Telefonbau und Normalzeit G.m. b.H., Frankfurt am Main, Germany, a German firm Filed Dec. 26, 1957, Ser. No. 705,347

Claims priority, application Germany Mar. 20, 1957

5 Claims. (Cl. 179—100.2)

This invention relates to rotatable electromagnetic transducers, i.e. rotatable magnetic systems for transforming audio currents, and more particularly to such systems enabling to accelerate or decelerate the speed of reproduction or playback of audio records on magnetic tape without changing the pitch of the sounds involved.

It is one object of the invention to provide a device capable of reproducing records of speech, or music, at a more rapid, or less rapid, speed than that at which the original record thereof was made, without affecting the pitch, and other tonal qualities, of the sounds involved. Devices of this character may be used by stenographers for reducing the speed of playback of dictation relative to the speed of the original dictation, or to facilitate the understanding of speech in foreign languages by reducing the speed of playback. Acceleration of reproduction may be desired in cases where the skill of musicians is not sufficient to keep pace with exacting speed requirements. Devices for changing the speed of playback of sound are also needed for synchonizing sound films, as necessary where sound has been recorded separately from the motion picture. Another very important application of transforming audio currents with a view to changing the speed of reproduction without changing the tonal qualities of the record is the broadcasting of intelligence and of music where it is often desired to compress, or to stretch, the time of playback of a given record.

In order to reproduce a sound track on a magnetic tape with a high degree of fidelity, the relative velocity between the playback head and the tape must be the same as the relative velocity between the recording head and the tape at the time the sound track was recorded thereon. A change of a few percent in the relative speed of reproduction in regard to the relative speed at the original recording changes the tonal qualities of the reproduction so drastically as to make it impossible to even recognize a well known voice. A change in the speed of reproduction or playback can be achieved by maintaining the relative velocity between reproducing head and tape exactly the same as the relative velocity between recording head and tape during the original recording operation, but increasing or decreasing, as the case may be, the absolute velocity at which the tape is being moved. An increase of the absolute velocity of the tape results in shortening, and a decrease of the absolute velocity of the tape results in lengthening, of the time required for reproducing a given sound record track on a tape. Varying the absolute velocity of a tape at will while maintaining a predetermined relative velocity between reproduction head and tape calls for electroacoustic systems having multiple magnetic playback heads.

It is one object of this invention to provide improved rotatable multiple magnetic playback heads or transducers.

Where the absolute velocity of a tape is being increased to shorten the time of playback, and the relative velocity between reproduction head and tape is maintained at a given value to maintain the pitch of the sounds involved, certain increments of the sound track are being periodically omitted, or deleted. Similarly, where the absolute velocity of a tape is being decreased to lengthen the time of playback, periodic increments of the sound track are being repeated, i.e. played twice, during reproduction of the tape. The shortest audible sound is a sound whose duration is 40 milliseconds. The duration of the increments on the sound track which are being deleted, or repeated, as the case may be, must be less than 40 milliseconds, to preclude these deletions or repetitions from being noticed. Considering a magnetic tape moving at a velocity of 76 cms. per sec., the distance between two adjacent magnetic heads of a multiple magnetic reproduction head, i.e. the distance between the gaps thereof, must be 31 millimeters to comply with the requirement that the increments of the sound track deleted, or repeated, during playback not exceed 40 milliseconds. At a tape velocity of 38 cms. per second the distance between adjacent gaps of a rotatable multiple magnetic reproduction head must be as small as 15.5 millmeters, and at a tape velocity of 19 cms. per second the distance between adjacent gaps of a rotatable multiple magnetic playback head must be as small as 7.75 millmeters. It is very difficult and expensive to manufacture rotatable multiple reproduction heads having an excessively small spacing between the individual constituent playback heads thereof.

It is, therefore, another object of this invention to provide improved rotatable multiple magnetic playback heads for tape playback systems which heads lend themselves to be readily manufactured at relatively small cost, however narrow the spacing between adjacent poles or air gaps thereof may be.

Another object of this invention is to further improve the playback heads or electromagnetic transducers disclosed in my copending patent application Ser. No. 618,766 filed October 26, 1956 for Rotatable Magnetic Systems for Transformation of Audio Currents.

Other objects and advantages of the invention will become apparent as this specification proceeds, and the features of novelty which characterize the invention will be pointed out with particularity in the appended claims forming part of this specification.

For a better understanding of the invention reference may be had to the accompanying drawings in which.

Figure 1:
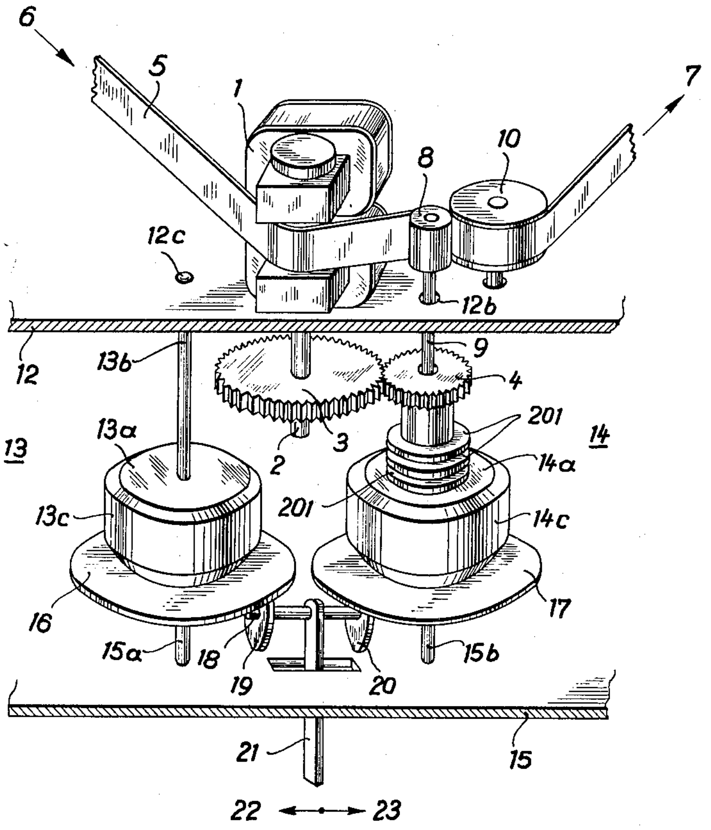
Fig. 1 is an isometric view of a complete electroacoustic playback system embodying the invention.
Figures 2, 3:
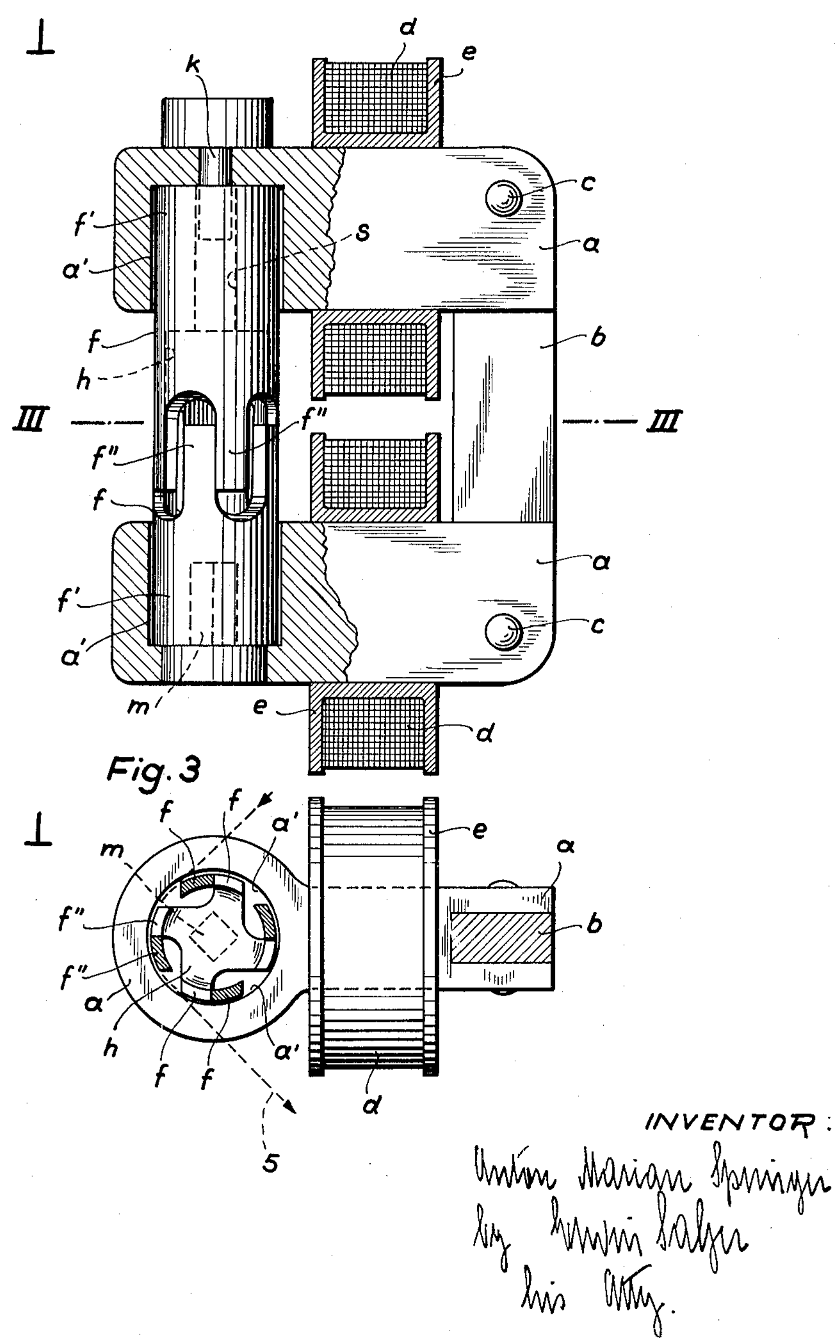
Fig. 2 is partly a side elevation and partly a vertical section of a playback head or electromagnetic transducer embodying the invention.
Fig. 3 is a section along 3—3 of Fig. 2.
Figure 4:
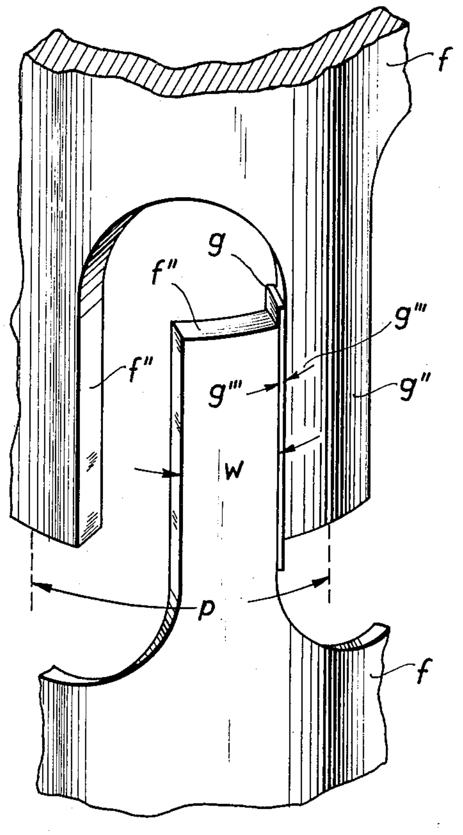
Fig. 4 is an isometric view of a detail of the structure of Figs. 1 and 2 shown a considerably larger scale.

Referring now to the drawings, and more particularly to Fig. 1 thereof, numeral 1 has been applied to generally indicate a rotatable multiple magnetic playback head. The structural details of playback head 1 are shown in Figs. 2 to 4, inclusive, and will be described in connection with these figures. Magnetic playback head 1 is driven by shaft 2. Gear 3 is fixedly mounted on shaft 2 and driven by gear 4. Magnetic tape 5 is wound at a predetermined angle around the cylindrical surface of magnetic playback head 1, and moves in the direction of arrows 6 and 7 from a supply reel (not shown) supposed to be on the left to a take up reel (not shown) supposed to be on the right of Fig. 1. The tape drive comprises capstan 8 fixedly mounted on driving shaft 9 parallel to driven shaft 2, and the pressure roller 10. The tape drive further includes a pair of synchronous motors generally indicated by reference numerals 13 and 14. The axes of rotation and the shafts of motors 13 and 14 are arranged parallel to each other, and parallel to the driving shaft 2 of magnetic playback head 1. Motors 13 and 14 are arranged between a pair of parallel plates 12 and 15 forming part of a mounting frame structure or chassis. Synchronous motor 14 comprises the rotor **14*a* mounted on, or coupled with, shaft 9 supported in bearings 12*b* and 15*b* provided in plates 12 and 15, and stator 14*c*. Motor 14 is intended to be energized from a three-phase A.-C. power source by means of slip rings 201. Friction plate 17 is arranged coaxially with respect to rotor 14*a* and stator 14*c* and fixedly mounted on the former for joint rotation therewith. Synchronous motor 13—which is an auxiliary motor—comprises the rotor 13*a* mounted on shaft 13*b* supported in bearings 12*c* and 15*a* in frame plates 12 and 15. Motor 13 further comprises the stator 13*c* fixedly mounted on the chassis, whereas stator 14*c* of motor 14 is rotatable about shaft 9, and thus adapted to rotate relative to chassis plates 14, 15. Friction plate 16 is arranged coaxially with respect to rotor 13*a* and sator 13*c*, and fixedly mounted on the former for joint rotation therewith. Shaft 18 supporting friction rollers 19, 20 is supported by a bearing rod 21 adapted to be shifted selectively either to the left, or to the right, as indicated by the arrows 22 and 23. Shaft 18 is arranged at right angles to shafts 9 and 13*b*, and rollers 19 and 20 are in frictional engagement with friction plates 16, 17 and thus adapted to transmit the rotary motion of rotor 13*a* of motor 13 to the rotor 14*a* of motor 14. Shifting of lever 21 to the left or right, as the case may be, permits a continuous change of the gear ratio of transmission 16, 19, 18, 20 and 17, and hence a continuous change of the angular velocity at which rotor 14*a* is being driven by rotor 13*a*. Gear 4 driving gear 3 on the shaft of playback head 1 is fixedly mounted on stator 14*c*** for joint rotation therewith.

Since the relative angular velocity between the stator and the rotor of a synchronous motor is constant, and since playback head 1 is being driven by the stator **14*c* and capstan 8 is being driven by the rotor 14*a* of synchronous motor 14, the relative velocity between the surface of playback head 1 and the magnetic tape 5 will be constant. The absolute velocity of tape 5 depends upon the angular velocity of capstan 8 which, in turn, depends upon the angular velocity of rotor 14*a*. The latter velocity depends, in turn, on the gear ratio of transmission 16, 19, 18, 20 and 17** which can be changed continuously to achieve either decelerated, or an accelerated playback, as desired.

For a more complete disclosure of the structural features of playback head 1 reference ought to be had to Figs. 2 to 4, inclusive.

Referring now to Figs. 2 to 4, numeral 1 has been applied to generally designate the playback head or electromagnetic transducer referred to in connection with Fig. 1. The structure comprises a substantially U-shaped core of a suitable magnetic material whose permeability is high. The core includes two shank portions *a* and a yoke *b* magnetically interconnecting the two shank portions *a*. Rivets *c*, or like fasteners, are provided for securing shanks *a* to yoke *b*. An electromagnet winding *d* is mounted on each of shanks *a* by the intermediary of a support *e*. Both windings *d* are wound in the same sense in regard to a closed magnetic flux in the core structure *a*, *b*, i.e. a magnetic flux extending clockwise or counterclockwise through shanks *a* and core *b* and across the space between shanks *a*. Shanks *a* each define a pair of vertical coaxial cylindrical recesses *a'* arranged at right angles to shanks *a*. The cylindrical surfaces of recesses *a'* form pole surfaces by which a magnetic flux may enter, and may leave, the fixed U-shaped core system *a*, *b*. A pair of tubular bodies, rotors or armatures *f* provides a magnetic flux path of relatively low reluctance between the left ends of shanks *a* (as seen in Fig. 1). Each of parts *f* comprises a cylindrical portion *f'* forming a pole surface arranged in coaxial relation with respect to one of the concave pole surfaces *a'* and spaced therefrom by a narrow cylindrical air gap. Each rotor or armature *f* comprises a plurality of projections *f''* situated at juxtaposed ends of rotors or armatures *f*, i.e. at the ends thereof remote from pole surfaces *f'* engaging cavities *a'*. Projections *f''* extend in the direction of the common axis of cavities *a'* and rotors or armatures *f*, i.e. in a direction longitudinally of rotors or armatures *f*. Fig. 4 shows on a larger scale a portion of the upper rotor *f* and a portion of the lower rotor *f* and several projections *f''* of both rotors *f*. The distance between centers of projections *f''* has been indicated by the reference character *p*. This is the circular pitch of projections *f''*. Reference character *w* has been applied to indicate the width of projections *f''*. The circular pitch and the width of the projections *f''* of both the upper and the lower rotor *f* are equal. The circular pitch *p* of projection *f''* exceeds considerably the width *w* of projections *f''*. The projections *f''* of one of rotors *f* are angularly displaced relative to, and interleave with, the projections *f''* of the other rotor *f*. Juxtaposed lateral surfaces *f'''* (see particularly Fig. 4) form a plurality of very narrow magnetic pole gaps. As shown in Fig. 4 these gaps are filled by spacers *g* in sheet form. These spacers consist of a suitable diamagnetic material and have a thickness *g'''* in the order of few microns, e.g. of two microns ($1\mu=10^{-4}$ cm.). Spacers *g* are attached to the projections *f''* of both rotors *f*. As a result, both rotors *f* are mechanically coupled so that when one of them is being driven by shaft 2 (shown in Fig. 1), power will be transmitted through spacers *g* to the other rotor, and the other rotor will rotate in synchronism with the rotor which is being directly driven by shaft 2. Spacers *g* and the means by which they are attached to projections *f''* maintain a predetermined angular displacement between the upper rotor *f* and the lower rotor *f*.

It will be apparent from the foregoing that rotors *f* define cavities *h* on juxtaposed sides thereof and are equidistantly radially slotted at the region thereof where cavities *h* are located, thus forming the aforementioned circularly arranged axial projections *f''*.

As mentioned before, the fixed or stationary parts *a*, *b*, of the magnet system are made of a magnetic material having a very high permeability, e.g. Mumetal. The upper shank *a* is provided with a transverse bore receiving a brass pin *k* which enters into an axial bore *s* in the upper rotor *f*, thus rotatably supporting the dual rotor unit *f*, *f* at the upper end thereof. The lower rotor *f* is provided with a recess *m* which is preferably square in cross-section and intended to receive the square upper end of shaft 2 (see Fig. 1).

In the embodiment of the invention shown each of both rotors *f* is provided with four projections *f''*. The number of projections may be increased, or decreased, as desired. The diameter of rotors *f* may be reduced to a few millimeters, enabling to minimize the speed at which the magnetic tape intended to engage the rotors *f* of transducer 1 must be moved. It is apparent from Fig. 1 that the magnetic tape engages the periphery of the rotors *f* of the transducer 1 along a predetermined angle. This angle depends upon the number of projections *f''*, or the number of pairs of magnetic poles formed by projections *f''*. The above angle ought to be 90 degrees if the number of pairs of poles is four. The dotted line in Fig. 3 designated by reference numeral 5 indicates how the magnetic tape is supposed to engage the rotors *f* of transducer 1.

It will be apparent from the foregoing that windings or coils *d* are fixed, thus making it possible to dispense with slip rings or the like relatively movable contact structures. As mentioned above, both coils *d* are wound in the same sense in regard to the closed magnetic flux extending through the fixed magnet system *a*, *b* and the two rotors *f*. Extraneous magnetic fields tends to produce magnetic fluxes in parallel through both windings *d*, resulting in opposite E.M.F's tending to neutralize each other. This, in turn, minimizes the noise level of the transducer.

The length of projections *f''* exceeds slightly the width of the tape intended to be used conjointly with transducer 1. Projections *f''* of rotors *f* engage in the fashion of the dogs of a dog clutch or coupling, and operate in the fashion of such dogs as far as the transmission of power from the lower driving rotor *f* to the upper or driven rotor is concerned.

The aforementioned spacers *g* arranged between immediately adjacent magnetic pole-forming projections *f''* are preferably made of beryllium. This rare metal combines the required diamagnetic property with great hardness and can be rolled to form sheets as thin as required, i.e. in the order of a few microns.

The gap formed between the axially outer ends of tubes *f* and the cylindrical cavities or recesses *a'* may be made as narrow as desired, thus minimizing the aggregate reluctance of the entire flux path. Cavities or recesses *a'* may, in fact, be made so narrow as to define bearing surfaces for the axially outer ends of tubes *f*, i.e. there may be a slight frictional engagement of cavities *a'* by tubes *f*.

It will also be apparent from the foregoing that each line of flux across the rotatable armature crosses or spans but one single gap inside of the armature, i.e. the gap filled by one of spacers *g* at the axially inner ends of magnetic tubes *f*. This is due to the fact that the rotors are made up of simple coaxial tubes or hollow cylinders with no bends therein of which the axially outer ends enter cavities *a'* and of which the axially inner ends form the pole pieces or projections *f''*.

While in accordance with the patent statutes, I have disclosed the details of a preferred embodiment of my invention, it is to be understood that many of these details are merely illustrative and variations in their precise form will be possible or necessary depending upon the particular nature of application. I desire, therefore, that my invention be limited only to the extent set forth in the appended claims and the prior art.

I claim as my invention:

1. A rotatable electromagnetic transducer comprising electromagnetic winding means, a magnetic core magnetically coupled with said winding means, said core having a pair of pole members each defining one of a pair of coaxial cylindrical cavities, a pair of coaxial cylindrical rotors each projecting with the axially outer end thereof into one of said pair of cavities, each of said pair of rotors comprising a plurality of circularly arranged projections situated at juxtposed ends of said pair of rotors and extending in the direction of the common axis thereof, said plurality of projections of each of said pair of rotors having a predetermined circular pitch and said plurality of projections of one of said pair of rotors being angularly displaced relative to and interleaving with said plurality of projections of the other of said pair of rotors, and juxtaposed lateral surfaces of said plurality of projections of said pair of rotors forming a plurality of narrow magnetic pole gaps.

2. A rotatable electromagnetic transducer comprising a substantially U-shaped core of magnetic material arranged with the shanks thereof in horizontal position, electromagnetic winding means mounted on said core, said shanks defining a pair of vertical concave cylindrical coaxial pole surfaces, a pair of rotatable armatures each having a vertical convex cylindrical pole surface arranged in coaxial relation to one of said pair of concave pole surfaces and spaced therefrom by a narrow cylindrical air gap, each of said pair of armatures comprising a plurality of projections arranged in a circular pattern and situated at the end of each of said pair of armatures remote from said convex pole surface thereof and extending in the direction of the common axis of said pair of armatures, said plurality of projections having a predetermined circular pitch and said plurality of projections of one of said pair of armatures being angularly displaced in regard to and interleaving with said plurality of projections of the other of said pair of armatures, means secured to both of said pair of armatures to maintain the angular displacement thereof, and an electric motor drive including a vertical driving shaft arranged coaxially to said pair of armatures and adapted to drive said pair of armatures.

3. A rotatable electromagnetic transducer comprising a substantially U-shaped core of magnetic material, electromagnetic winding means mounted on said core, a pair of coaxial cylindrical recesses each defined by one of the shanks of said core and arranged at right angles to said shanks, a pair of coaxial rotors of magnetic material each arranged with one end thereof in one of said pair of recesses, said pair of rotors each having a plurality of circularly arranged angularly spaced projections at the side thereof remote from said pair of recesses, each of said plurality of projections of each of said pair of rotors forming a magnetic pole face extending substantially in a direction longitudinally of said pair of rotors, and a plurality of narrow spacers of a diamagnetic material each separating a magnetic pole face formed on one of said pair of rotors from a magnetic pole face formed on the other of said pair of rotors.

4. A rotatable electromagnetic transducer comprising a stationary magnet system defining a pair of cylindrical coaxial cavities forming pole surfaces of opposite polarity, a pair of rotatable magnetic tubes each having an axially outer portion and an axially inner portion, said axially outer portion of each of said pair of tubes being arranged coaxially in one of said pair of cavities forming a narrow cylindrical air gap therebetween, the axially inner portion of each of said pair of tubes being equidistantly radially slotted to form a plurality of circularly arranged axially extending pole face projections on each of said pair of tubes, said plurality of projections on one of said pair of tubes being angularly displaced with respect to and interleaving with said plurality of projections on the other of said pair of tubes.

5. A rotatable electromagnetic transducer comprising a substantially U-shaped core of magnetic material having a pair of parallel shanks, a first winding mounted on one of said pair of shanks, a second winding wound in the same sense as said first winding mounted on the other of said pair of shanks, said pair of shanks defining a pair of cylindrical coaxial cavities forming pole surfaces of opposite polarity, a pair of rotatable coaxial tubes of magnetic material each having an axially inner portion and an axially outer portion, said axially outer portion of each of said pair of tubes being coaxially arranged in one of said pair of cavities forming a narrow cylindrical air gap therebetween, the axially inner portion of each of said pair of tubes comprising a plurality of circularly arranged projections extending in the direction of the common axis of said pair of tubes, said plurality of projections of each of said pair of tubes having a predetermined circular pitch and said plurality of projections of one of said pair of tubes being angularly displaced in regard to and interleaving with said plurality of projections of the other of said pair of tubes, and means for maintaining the angular displacement of said pair of tubes comprising a plurality of spacers of a diamagnetic material having a thickness in the order of microns each arranged between one of said plurality of projections on one of said pair of tubes and one of said plurality of projections on the other of said pair of tubes.

References Cited in the file of this patent

UNITED STATES PATENTS

| | | |
|---|---|---|
| 2,628,286 | Rettinger | Feb. 10, 1953 |
| 2,881,263 | Gratian | Apr. 7, 1959 |

FOREIGN PATENTS

| | | |
|---|---|---|
| 760,874 | Great Britain | Nov. 7, 1956 |
| 1,107,292 | France | Aug. 3, 1955 |